(12) United States Patent
Wright et al.

(10) Patent No.: US 8,799,879 B2
(45) Date of Patent: Aug. 5, 2014

(54) METHOD AND APPARATUS FOR PROTECTING TRANSLATED CODE IN A VIRTUAL MACHINE

(75) Inventors: Gregory M. Wright, Mountain View, CA (US); Christopher A. Vick, San Jose, CA (US); Peter B. Kessler, Palo Alto, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1034 days.

(21) Appl. No.: 12/495,367

(22) Filed: Jun. 30, 2009

(65) Prior Publication Data

US 2010/0333090 A1 Dec. 30, 2010

(51) Int. Cl.
*G06F 9/45* (2006.01)
(52) U.S. Cl.
USPC ............ 717/148; 717/136; 717/140; 717/145
(58) Field of Classification Search
USPC .......................................... 717/148, 140, 145
See application file for complete search history.

(56) References Cited

U.S. PATENT DOCUMENTS

| | | | |
|---|---|---|---|
| 6,115,809 A * | 9/2000 | Mattson et al. | 712/239 |
| 6,961,806 B1 * | 11/2005 | Agesen et al. | 711/6 |
| 7,281,102 B1 * | 10/2007 | Agesen et al. | 711/6 |
| 7,984,304 B1 * | 7/2011 | Waldspurger et al. | 713/187 |
| 2006/0206658 A1 * | 9/2006 | Hendel et al. | 711/6 |
| 2006/0259734 A1 * | 11/2006 | Sheu et al. | 711/203 |
| 2008/0244530 A1 * | 10/2008 | Mitran | 717/128 |
| 2009/0037936 A1 * | 2/2009 | Serebrin | 719/318 |
| 2010/0058358 A1 * | 3/2010 | Franke et al. | 719/319 |
| 2010/0250869 A1 * | 9/2010 | Adams et al. | 711/154 |
| 2011/0010483 A1 * | 1/2011 | Liljeberg | 711/6 |

OTHER PUBLICATIONS

Kemal Ebcioglu, et al., IBM Research Report, Daisy: Dynamic Compilation for 100% Architectural Compatibility, published at Aug. 6, 1996.*
Dehnert, et al.,Transmeta code morphing software, published on Mar. 2003.*
Kemal Ebcioglu et al ("IBM Research Report, DAISY: Dynamic Compilation for 100% Architectural Compatibility"), Aug. 5, 1996.*

* cited by examiner

*Primary Examiner* — Chat Do
*Assistant Examiner* — Jae Jeon
(74) *Attorney, Agent, or Firm* — Park, Vaughan, Fleming & Dowler LLP; Mark D. Spiller

(57) ABSTRACT

One embodiment provides a system that protects translated guest program code in a virtual machine that supports self-modifying program code. While executing a guest program in the virtual machine, the system uses a guest shadow page table associated with the guest program and the virtual machine to map a virtual memory page for the guest program to a physical memory page on the host computing device. The system then uses a dynamic compiler to translate guest program code in the virtual memory page into translated guest program code (e.g., native program instructions for the computing device). During compilation, the dynamic compiler stores in a compiler shadow page table and the guest shadow page table information that tracks whether the guest program code in the virtual memory page has been translated. The compiler subsequently uses the information stored in the guest shadow page table to detect attempts to modify the contents of the virtual memory page. Upon detecting such an attempt, the system invalidates the translated guest program code associated with the virtual memory page.

18 Claims, 10 Drawing Sheets

METHOD AND APPARATUS FOR PROTECTING TRANSLATED CODE IN A VIRTUAL MACHINE

BACKGROUND

1. Field of Invention

This disclosure generally relates to virtual machines. More specifically, this disclosure relates to techniques that facilitate managing translated program code in a virtual machine that supports self-modifying program code.

2. Related Art

Virtual machines can be used to emulate different hardware environments on the physical hardware of a computing device. For instance, a virtual machine can facilitate executing programs that have been compiled for a different instruction set architecture (ISA) than that of the computing device. Moreover, two or more virtual machines that emulate different hardware environments and/or operating systems may co-exist and simultaneously execute guest programs on the same computing device.

Program instructions specified in a "guest" ISA typically need to be translated before they can execute in the native ISA of a computing device. For instance, a dynamic compiler can analyze blocks of guest instructions in a guest program and can then compile (or "translate") these guest instructions into a sequence of optimized native ISA instructions which, when executed, achieve the same results as the original guest program. These translated native ISA instructions are maintained in a code cache, and can be executed by multiple instances of the guest program. However, caching such translated native ISA instructions can be problematic when guest program code changes during execution. For instance, self-modifying guest program code may change instructions in the guest program code, thereby resulting in a cached set of translated native ISA instructions that no longer match the modified guest program code.

Hence, what is needed are structures and methods that facilitate executing guest programs in a virtual machine without the above-described problem.

SUMMARY

One embodiment provides a system that protects translated guest program code in a virtual machine that supports self-modifying program code. While executing a guest program in the virtual machine, the system uses a guest shadow page table associated with the guest program and the virtual machine to map a virtual memory page for the guest program to a physical memory page on the host computing device. The system then uses a dynamic compiler to translate (e.g., compile) guest program code in the virtual memory page into translated guest program code (e.g., native program instructions for the computing device). During compilation, the dynamic compiler stores (in a compiler shadow page table and the guest shadow page table) information that tracks whether the guest program code in the virtual memory page has been translated. The compiler subsequently uses the information stored in the guest shadow page table to detect attempts to modify the contents of the virtual memory page. Upon detecting such an attempt, the system invalidates the translated guest program code associated with the virtual memory page.

In some embodiments, the system tracks whether the guest program code in a virtual memory page has been translated by: (1) marking the virtual memory page as not writable in the guest shadow page table; (2) mapping the virtual memory page as readable in the compiler shadow page table prior to loading and compiling the guest program code in the virtual memory page; and (3) detecting an attempt to modify the virtual memory page by detecting a fault when the virtual machine attempts to write to a virtual memory page that is marked as not writable in the guest shadow page table.

In some embodiments, the system determines whether an access to a virtual memory page is attempting to modify a virtual memory page that has been marked read-only by the guest program. If so, the system triggers a fault that is handled by a guest operating system associated with the guest program.

In some embodiments, the system invalidates from a code cache a section of translated native program code, wherein the section of translated code is associated with a virtual memory page. The system then updates the compiler shadow page table to indicate that the translated native program instructions associated with the virtual memory page are no longer available, and then updates the guest shadow page table to indicate that the virtual memory page is both readable and writable.

In some embodiments, the system maintains an index that maps virtual memory pages containing guest program code to the associated translated native program instructions in the code cache. The system uses this index to determine the set of native program instructions in the code cache that need to be invalidated when a virtual memory page containing guest program instructions is modified.

In some embodiments, a virtual memory page may contain two or more guest program segments that have been independently translated into native program instructions. In some embodiments, invalidating a section of translated guest program code in the virtual memory page may involve invalidating all of the translated guest program code segments associated with the virtual memory page. In some alternative embodiments, the system may instead: (1) invalidate only some of the translated guest program code segments associated with the virtual memory page; (2) modify the virtual memory page in a protected manner; and (3) subsequently restore the not-writable status of the virtual memory page after the modifications are complete.

In some embodiments, the system indicates that the guest shadow page table has already been modified to protect a virtual memory page from writes by marking the virtual memory page as readable in the compiler shadow page table. This technique allows the dynamic compiler to operate with reduced overhead and checks.

In some embodiments, when the guest program accesses a virtual address, the system first translates the virtual address in the guest program to a second virtual address that corresponds to the physical address space of the guest machine, and then translates the second virtual address into a physical memory address for the computing device. After performing these initial two translations, the system then caches in the guest shadow page table the mapping from the virtual address in the guest program to the physical memory address.

In some embodiments, the dynamic compiler and the guest program are associated with different address space context identifiers. In these embodiments, the system determines the shadow page table that will be used and/or affected by a given operation based on the address space context identifier associated with the operation.

In some embodiments, multiple guest program instances simultaneously executing in multiple guest address spaces may share one or more sections of translated native program code. The system needs to update the guest shadow page table and the compiler shadow page table associated with each of the multiple guest program instances when one of the multiple guest program instances modifies a virtual memory page associated with a shared section of translated native program code.

BRIEF DESCRIPTION OF THE FIGURES

In the figures, like reference numerals refer to the same figure elements.

DETAILED DESCRIPTION

Figure 1:
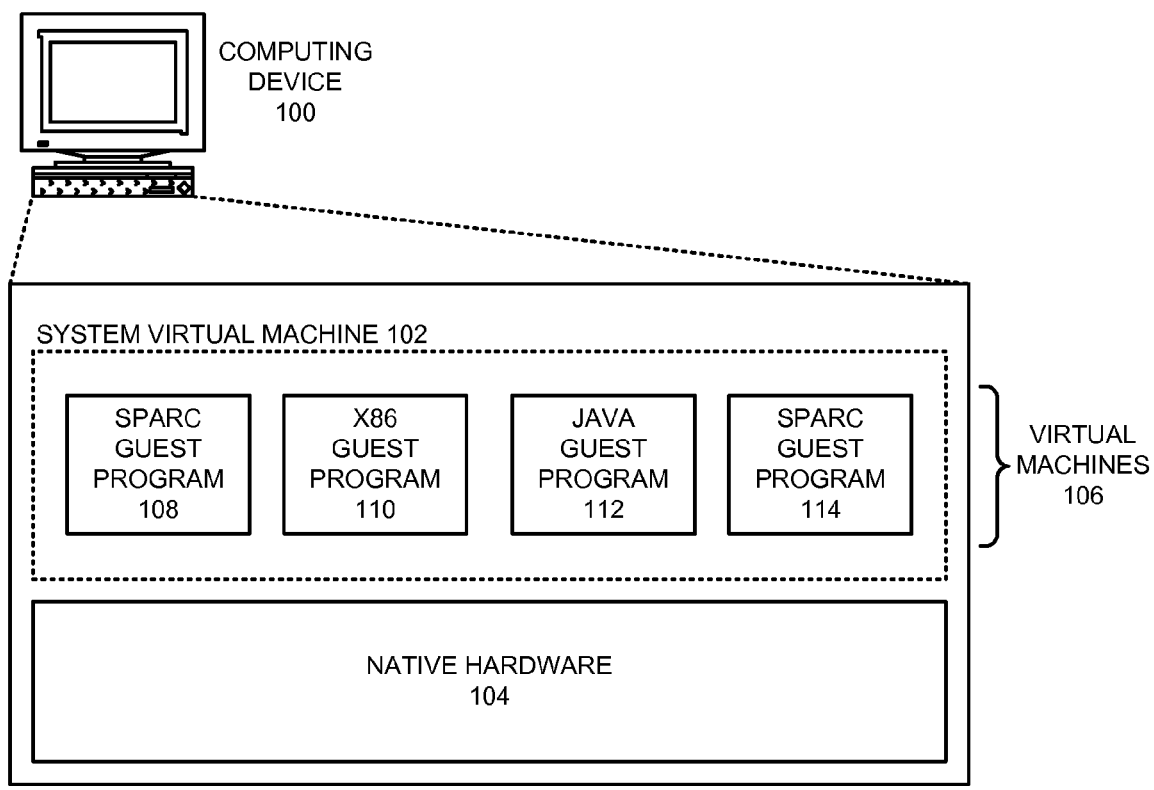
FIG. 1 illustrates a system virtual machine that allows the native hardware of a computing device to be shared across one or more virtual machines.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

System Virtual Machines

Some embodiments of the present invention involve techniques that support executing guest programs in a virtual machine.

A virtual machine can be used to emulate different hardware environments on the physical resources of a computing device. Hence, a "system virtual machine" allows the hardware resources of a machine to be shared across one or more different virtual machines, each of which can be associated with different applications running on separate operating systems instances. In the following description, the hardware upon which the virtual machine executes is referred to as the "native hardware," and is associated with a native instruction set architecture (ISA). A program that was originally compiled for a different set of hardware (referred to as the "original target hardware," or "guest hardware") with a different ISA (referred to as the "guest ISA") is referred to as a "guest" program (which is comprised of instructions in the guest ISA). The virtual machine executing on the native hardware attempts to exactly emulate the guest ISA. Note that in some cases, the guest ISA may not be associated with original target hardware, and may instead provide a platform-independent standard that is used for distributing hardware-independent program code.

FIG. 1 illustrates a system virtual machine 102 that allows the native hardware 104 of computing device 100 to be shared across one or more virtual machines 106. FIG. 1 illustrates a number of guest programs executing in virtual machines 106, including: SPARC® (SPARC is a registered trademark of SPARC International, Inc.) guest program 108; x86 guest program 110; Java™ (Java™ is a registered trademark of Sun Microsystems, Inc.) guest program 112; and SPARC® guest program 114. Note that SPARC® guest programs 108 and 114 may in some embodiments interact, share guest program code, share operating system code, and/or be supported by a common underlying virtual machine. Alternatively, in some embodiments SPARC® guest programs 108 and 114 may be completely separate and distinct.

Program instructions specified in a guest ISA typically need to be translated before they can execute in the native ISA of a computing device. This translation process can be implemented in a number of ways. For instance, an instruction set emulator can convert each instruction in the guest ISA into a set of instructions that emulate the same operation on the native ISA. Another alternative translation technique uses a dynamic compiler that: (1) analyzes larger blocks of guest instructions in the guest program; (2) translates these blocks into an intermediate representation; and (3) compiles these intermediate representations into a sequence of optimized native ISA instructions.

Note that executing a guest program on a virtual machine can involve performing additional checks and/or operations in the virtual machine that in a conventional environment would normally be performed by the guest hardware. For instance, a dynamic compiler reading guest instructions out of a guest process's address space may need to check that the virtual memory page containing a set of guest instructions is mapped as executable prior to compiling and executing a set of functionally equivalent native instructions. Other examples include transferring control between different protection domains and/or address spaces. For instance, when handling a system call in a guest program, the virtual machine may need to handle the operation of transitioning from executing the guest program in "user mode" (unprivileged) to executing privileged guest operating system code. In another example, a system virtual machine may need to manage transitions for a partitioned guest program that spans multiple address spaces and/or different virtual machine types. In general, a dynamic compiler and/or the virtual machine(s) need to ensure that the translated stream of native ISA instructions upholds the semantics of the original target hardware (or, in situations where no guest hardware exists, such as for a Java™ virtual machine, ensure that the translated stream of native ISA instructions upholds the semantics of the original guest program).

Figure 2:
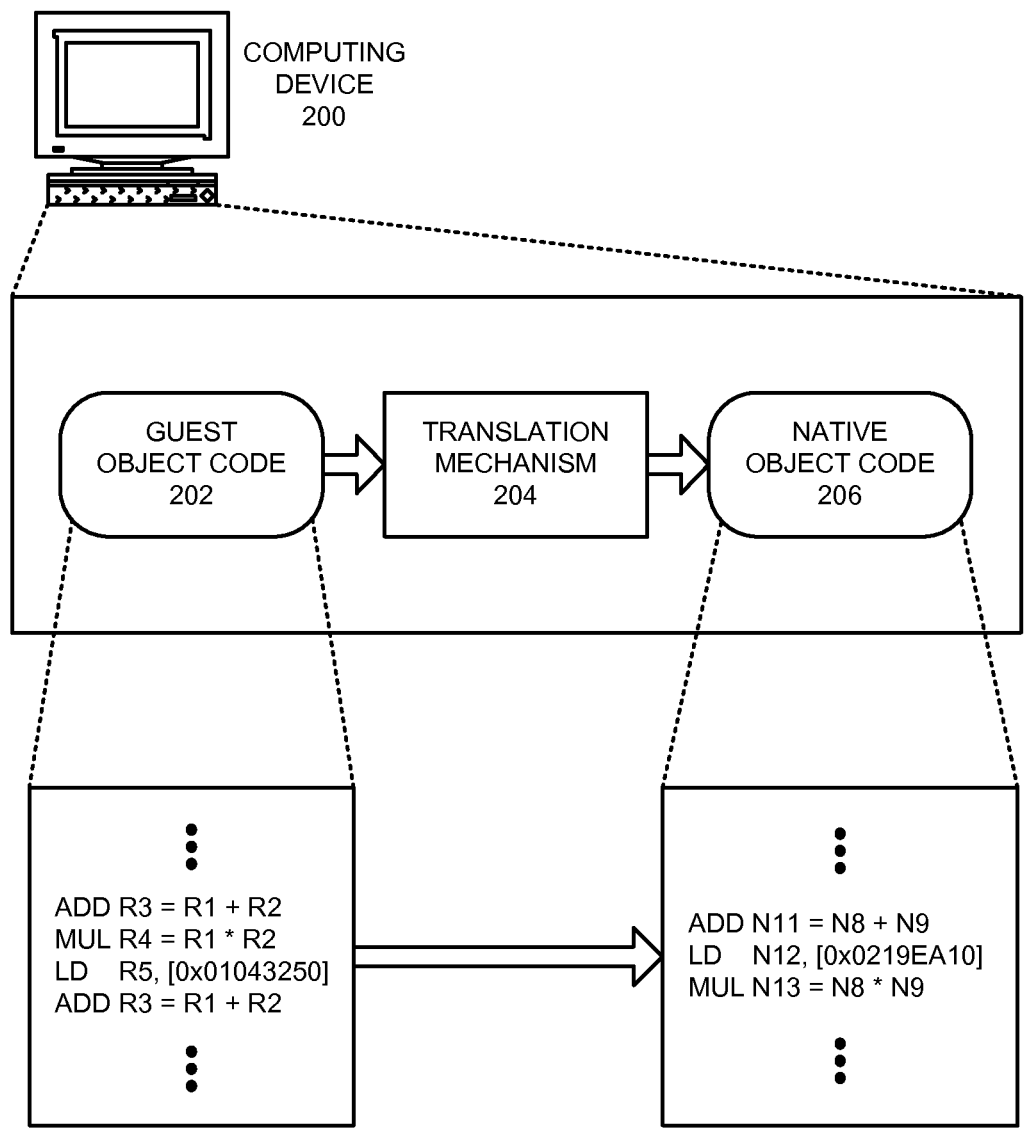
FIG. 2 illustrates a computing device that receives a set of guest object code.

FIG. 2 illustrates a computing device 200 that receives a set of guest object code 202. Prior to executing guest object code 202 in a virtual machine (not shown), computing device 200 uses translation mechanism 204 to translate (e.g., compile) guest object code 202 into native object code 206. FIG. 2 includes exemplary instructions for guest object code 202 that have been translated into a corresponding set of exemplary instructions in native object code 206. Note that translation mechanism 204 can perform high-level analysis of guest object code to determine an optimized set of native code instructions that do not exactly mirror the guest code instructions but achieve the same results. For instance, in this example, optimized native object code 206: (1) eliminates a repeated add instruction considered by an optimizer to be extraneous (specifically, the repeated "ADD R3=R1+R2" instruction); (2) swaps the order of execution for two independent load (LD) and multiply (MUL) instructions; and (3) modifies the instructions to use native registers (N8-N13) instead of the virtual registers (R1-R5) of the virtual ISA.

Issues with Self-Modifying Code in Virtual Machines

As described above, a dynamic compiler may analyze blocks of guest instructions in a guest program and then translate (e.g., compile) these guest instructions into a sequence of optimized native ISA instructions which, when executed on a computing device, achieve the same results as the original guest program. These compiled (or "translated") native ISA instructions can be cached in a code cache (e.g., an area of physical memory set aside for caching translated program code), so that subsequent calls to the same portion of the guest program can proceed without needing to re-translate the guest program code. The virtual machine and/or native operating system may include structures that map entry points in the guest program code to entry points into the translated program code stored in the code cache, so that the translated program code in the code cache can be re-used with low overhead.

However, caching such translated native ISA instructions can be problematic if the guest program code can change during execution. For instance, self-modifying guest program code may change instructions in the guest program code, thereby resulting in a cached set of translated native ISA instructions that no longer match the modified guest program code. More specifically, if the guest program code causes a previously translated guest instruction to be overwritten, the system needs to ensure that a subsequent attempt to execute the overwritten guest instruction does not execute the (now invalid) cached translated program code.

Note that self-modifying code, while sometimes discouraged as a programming practice, occurs fairly frequently in valid and useful contexts. For instance, self-modifying code is often used in virtual machines and in procedure linkage tables that are used for dynamic linking, and may also be explicitly supported by some types of guest hardware. For instance, the backwards-compatibility of the x86 architecture results in strongly defined support for self-modifying code, so a virtual machine supporting x86 guest programs would need to assume that guest program instructions may be self-modifying. Note also that the notion of "self-modifying" may not be limited only to a program that modifies itself, but may also include multiple programs that are typically executed together, and might be executed together in a system virtual machine. For example, because debuggers often replace instructions in a program being debugged with breakpoints, executing a guest program and an associated guest program debugger together in a system virtual machine can lead to situations where guest program instructions are changed. Hence, scenarios that involve self-modifying code may occur fairly frequently, and will generally need to be supported in a system virtual machine.

To resolve the consistency issues of caching translated program code, a virtual machine needs to: (1) detect attempts by a guest process or guest operating system to modify guest program instructions after they have been translated; (2) invalidate the translated program instructions from the code cache; and (3) re-translate the updated guest program instructions. A common technique in system virtual machines is to write-protect virtual memory pages from which guest code is compiled, so that any later stores which may modify the code are intercepted. On typical machine architectures, however, these techniques have two problems: (1) the compiler needs to, in software, check that the given virtual memory page is mapped with execute permission by walking the guest's page tables; and (2) if the virtual memory page is also found to be writable, the compiler needs to write-protect the virtual memory page to ensure that modifications will be detected. These checks can slow down and complicate the compiler's access to program code.

Hence, what is needed are low-overhead techniques that facilitate tracking the addresses of guest program instructions that have been translated and trapping modifications to such instructions. Embodiments of the present invention perform such low-overhead tracking using shadow page tables.

Shadow Page Tables in System Virtual Machines

Typically, an operating system for a computing device provides a virtual memory abstraction for applications. Following this abstraction, when a guest program executes in its intended guest hardware, the guest program instructions are typically stored in virtual memory pages, and virtual memory addresses accessed by the guest program instructions are translated to physical memory addresses for the guest hardware. In a virtual machine, however, the corresponding initial translation of the virtual memory address does not result in a physical memory address, but instead results in a second virtual memory address that corresponds to a second virtual address space. This second virtual address space, the domain address space, corresponds to the physical address space of the guest machine (which is, in a system virtual machine, provided and managed by the virtual machine), and is associated with a second page table. The virtual machine and/or native operating system use this second page table to translate the virtual memory address in the domain address space to a physical memory address for the native hardware.

Figure 3:
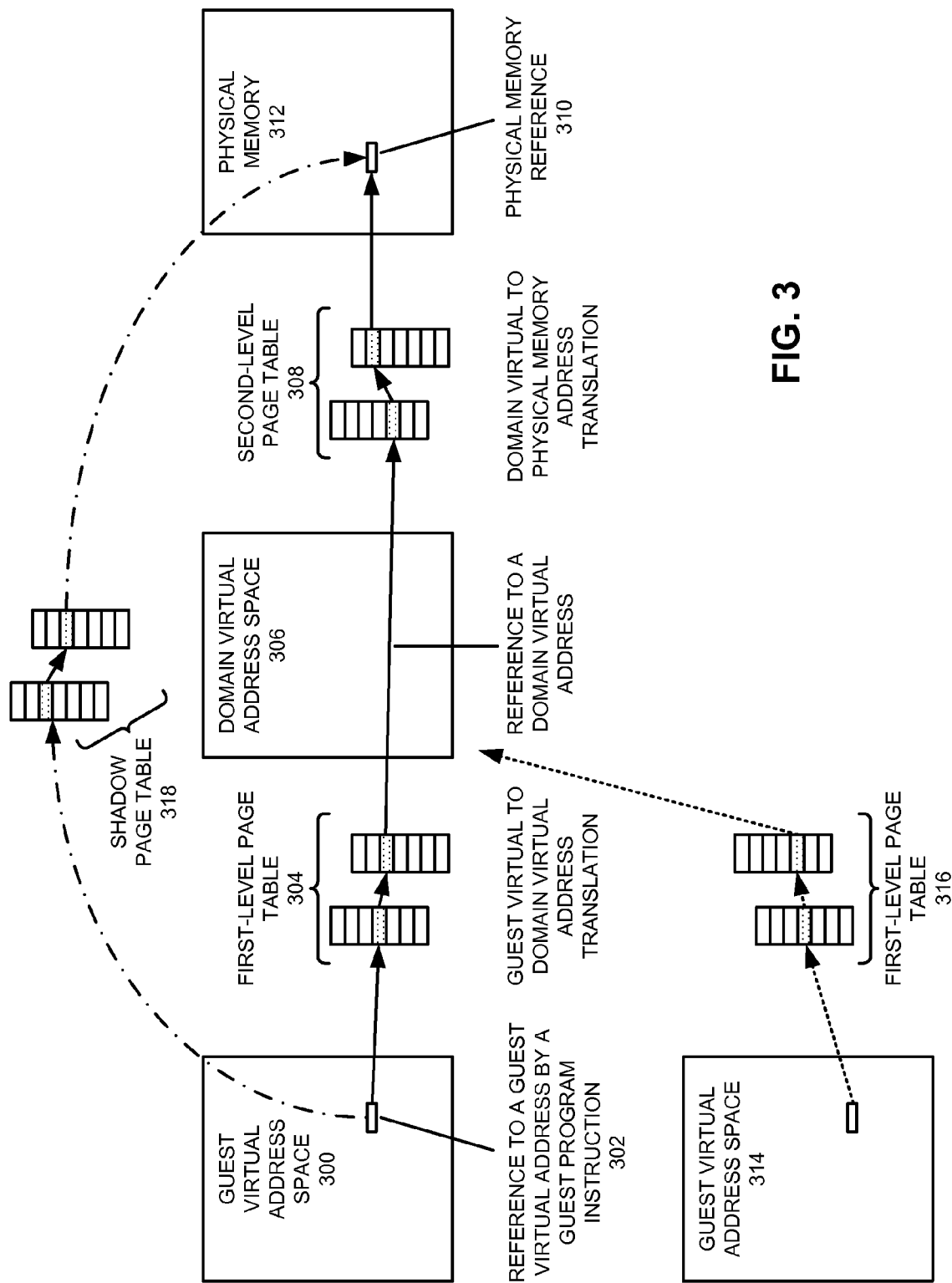
FIG. 3 illustrates an exemplary set of translation operations that occur during a guest program memory reference and a shadow page table in accordance with an embodiment.

FIG. 3 illustrates an exemplary set of translation operations that occur during a guest program memory reference. A memory reference made by a guest program instruction refers to an address in guest virtual address space 300. When handling memory reference 302, the virtual machine and/or operating system (not shown) use first-level page table 304 to translate the memory address from the guest virtual address space into a memory reference that is valid in the domain virtual address space 306 (e.g., the physical address space of the guest machine). The system then uses second-level page table 308 to translate this virtual address into a reference 310 to an address in physical memory 312.

Note that different guest programs (as well as multiple instances of the same guest program) executing in parallel will typically have distinct and separate virtual address spaces (e.g., in FIG. 3, guest virtual address space 300 and guest virtual address space 314). In some scenarios, multiple guest address spaces may map to a shared domain address space (e.g., when simultaneously executing multiple instances of a guest program, as shown), and multiple domain address spaces may share the underlying physical memory of the computing device. A separate page will typically be needed for every translation between address spaces, and hence each virtual machine may include multiple sets of page tables. For instance, each of the guest virtual address spaces (300, 314) in FIG. 3 has a separate first-level page table (304, 316) that translates virtual addresses in their respective address spaces into a domain virtual address. In both cases, the system then uses the second-level page table 308 to translate the domain virtual address to a physical memory address.

Performing address translations that involve multiple page-table look-ups for every memory access can involve significant overhead. For example, the system may need to access a translation lookaside buffer (TLB) and/or page tables for the translation of the guest virtual address, and then access a second TLB and/or set of page tables to translate the resulting domain virtual address to a physical address.

Shadow page tables reduce the overhead of multiple serial page-table look-ups by caching the two sets of translations performed by the two above-described levels of page tables into a single mapping. The system still maintains the previous two sets of page tables, but when populating entries in these tables during a translation, creates a mapping in the shadow page table between the guest virtual memory page and the target physical memory page, thereby effectively caching the complete translation process into a single look-up. The system then needs only a single page-table look-up for subsequent virtual memory accesses that "hit" in the shadow page table.

Note that shadow page tables are structures that are used by the native architecture to emulate the effect of the guest ISA's page tables. While the guest page tables (e.g., first-level page tables 304 and 316 in FIG. 3) are in a format known to the guest operating system and guest hardware, the second-level page tables and the shadow page tables are used by the native hardware and virtual machine, and hence do not need to be in the same format as the guest page tables. The virtual machine and native operating system will typically examine (and if necessary, populate) the first- and second-level page tables during an initial translation, and in the process add an entry into the shadow page table that maps directly from the guest virtual address space to the physical memory space. The virtual machine can then intercept memory accesses for the guest program, and use the shadow page table to speed up the look-up of guest virtual address references.

FIG. 3 illustrates a shadow page table 318 that caches translations from guest virtual address space 300 to physical memory 312. As described above, when translating a reference to a guest virtual address, the system uses first-level page table 304 and second-level page table 308 to reference 310 the corresponding address in physical memory 312. After the guest operating system and virtual machine have (respectively) created guest-virtual-to-domain-virtual and domain-virtual-to-physical-memory mappings in these two page tables, the virtual machine also adds an entry in shadow page table 318 that serves as a composition of the two mappings. During subsequent accesses to the same guest virtual memory page, the system can use the mapping in the shadow page table to perform low-overhead address translations for the guest program.

Note that the system may need to maintain a separate shadow page table for each unique composition of page tables. For instance, in FIG. 3, translations from guest virtual address space 314 would typically involve building and maintaining a second shadow page table (not shown) that is separate from the shadow page table 318 used to translate addresses from guest virtual space 300 into addresses in physical memory 312.

Some embodiments of the present invention use multiple shadow page tables to protect translated program code and detect self-modifying program code executed in a virtual machine.

Using Shadow Page Tables to Protect Translated Program Code

As described above, common sources of overhead for virtual machines include: (1) detecting the addresses from which the dynamic compiler obtains source instructions, and confirming that these source instructions have execute permissions; and (2) trapping and managing modifications to those source instructions (e.g., intercepting guest program instructions that attempt to store to addresses that contain other guest instructions, and then invalidating any corresponding translated instructions in the code cache). Embodiments of the present invention reduce virtual machine overhead by integrating execute-permission checks and the caching of write-protection state with the address translation operations that are performed when the compiler and guest program load instructions from a guest virtual address.

Embodiments of the present invention involve constructing two shadow page tables for a given guest process address space, instead of the typical single shadow page table. These two shadow page tables allow the virtual address space of the guest program to be viewed in two different ways. The system primarily uses the first shadow page table (referred to as the guest shadow page table, or GSPT) in the conventional manner described previously when executing translated code on behalf of the guest. For instance, when the guest program accesses an address in the guest virtual address space, the system uses the GSPT to perform the needed address translations. The second shadow page table (referred to as the compiler shadow page table, or CSPT) is used by compiler threads that are reading guest instructions to be compiled (note that there may be several compilation tasks occurring simultaneously for a given guest process). Note that while both shadow page tables are used to access the same underlying physical memory data, the system may use the two shadow page tables to store two different sets of status and permission information for the same underlying physical memory page. The advantage of having two separate shadow page tables is that the system can use the two different sets of information, along with the contents mapped in each shadow page table, to manage translated program code when the guest program attempts to modify guest instructions that have already been compiled into translated program instructions (that are stored in the code cache).

Figure 4A:
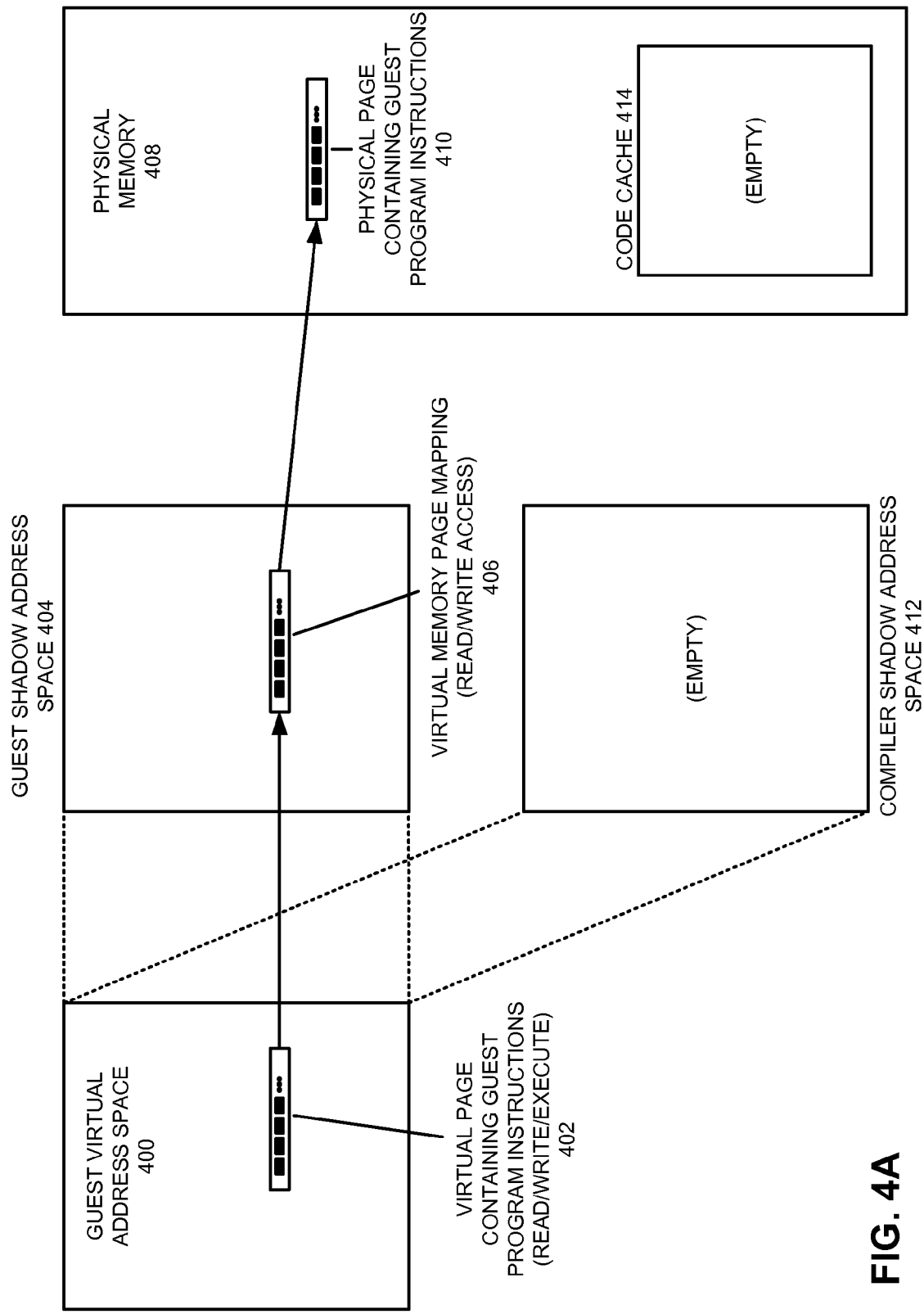
FIG. 4A illustrates the state stored by a guest shadow page table and a compiler shadow page table when a guest program is first loaded into a guest virtual address space in accordance with an embodiment.
Figure 4B:
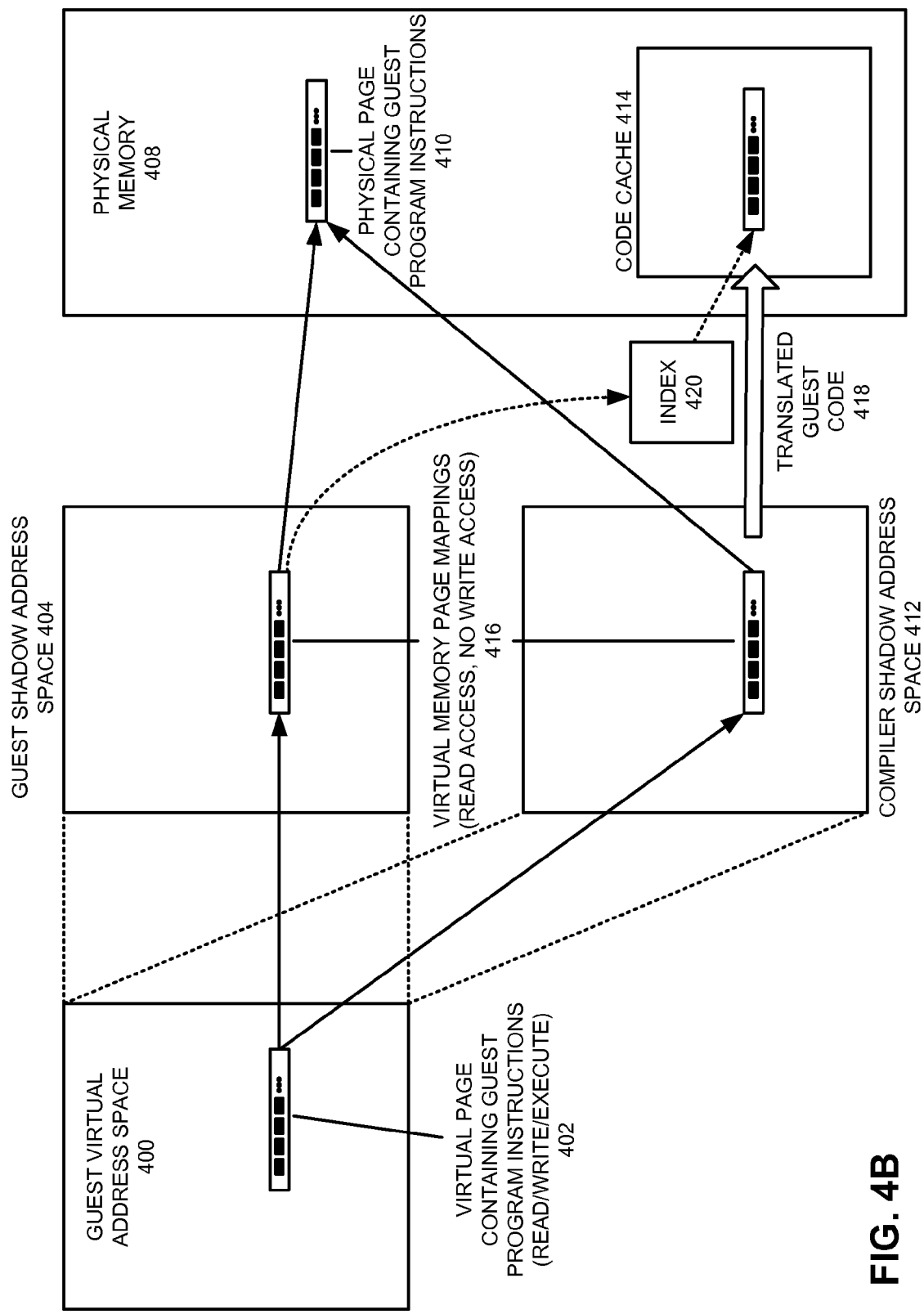
FIG. 4B illustrates the state stored by a guest shadow page table and a compiler shadow page table after a dynamic compiler has translated a set of guest program instructions into a set of native code instructions in accordance with an embodiment.
Figure 4C:
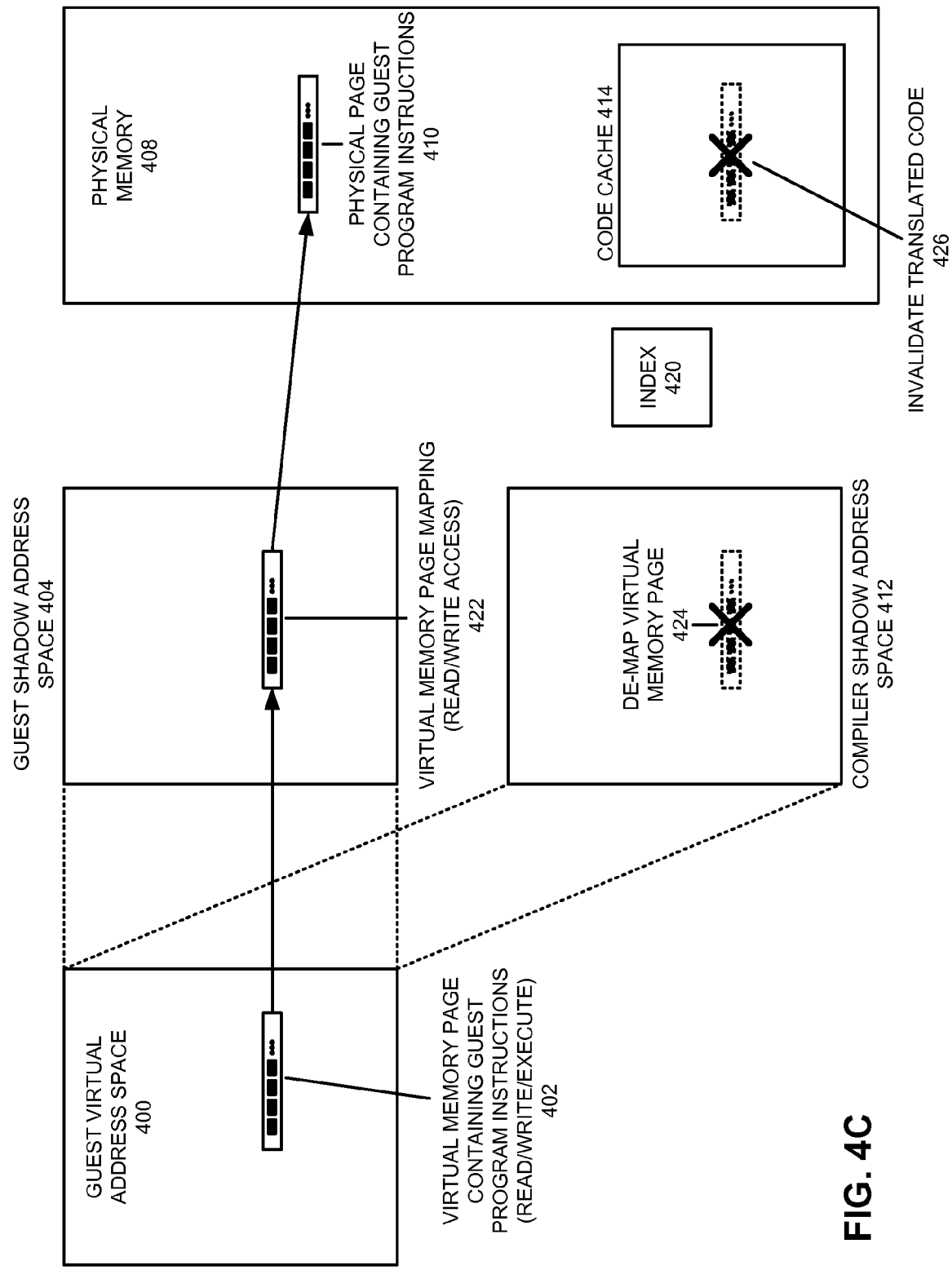
FIG. 4C illustrates the state stored by a guest shadow page table and a compiler shadow page table after the system has invalidated a set of translated code in response to an attempted write to a guest program instruction in a virtual memory page in accordance with an embodiment.

FIGS. 4A-4C illustrate the process of using two shadow page tables to manage translated program code so that attempts to modify guest instructions that have already been compiled can be managed with low overhead.

FIG. 4A illustrates the state stored by a GSPT and a CSPT at the time that a guest program is first loaded into guest virtual address space 400. A virtual memory page containing guest program instructions 402 is mapped into guest virtual address space 400 using the GSPT. Because the virtual memory page contains guest program instructions, the system configures the normal (non-shadow, first-level) guest page table (not shown) associated with the guest process to indicate that the guest process has read, write, and execute permissions for the virtual memory page. After setting up the normal (first-level and second-level) page tables for the virtual memory page, the system also updates a virtual memory page mapping 406 in the GSPT to reflect the mapping between the virtual memory page 402 and the corresponding physical page 410 in physical memory 408. Hence, by adding this mapping into the GSPT, the system maps virtual memory page 402 into the guest shadow address space 404 indicated by the GSPT. Note that at this initial point, the system marks in the GSPT that the virtual memory page is readable and writable, to mimic the permissions requested by the guest operating system for virtual memory page 402. Because no attempt has yet been made to invoke any guest program instructions in virtual memory page 402, the dynamic compiler has not been called, and no guest instructions have been translated. Hence, the CSPT (not shown) is empty (e.g., every page is unmapped in the CSPT, and hence the compiler shadow address space 412 indicated by the CSPT is also empty), and the code cache 414 region in physical memory 408 that is used to store translated guest program instructions is also empty.

As mentioned above, the system uses the GSPT to perform the address translations needed for loads and stores performed as part of guest program execution, and uses the CSPT to perform the reads needed to translate guest instructions. Hence, upon attempting to execute a guest program by jumping to the first instruction of the guest program, the system determines that there is no translation (e.g., compiled version) of the guest program instructions available in code cache 414, and invokes the dynamic compiler.

The dynamic compiler always loads its input guest program instructions via the CSPT. Although the given virtual memory page containing the first instruction has been mapped in the GSPT already, the same virtual memory page has not yet been mapped in the CSPT. Hence, the first time the compiler is invoked for the guest virtual memory page, the attempted load causes a page fault for the CSPT that triggers a special fault handler that is associated with the CSPT. This special fault handler:

1. looks up the corresponding virtual memory page in the guest operating system's page tables (e.g., in the first-level page table as illustrated in FIG. 3);
2. if the virtual memory page is not mapped as executable in the first-level page table, signals an exception in the compiler, thereby ending the compilation process;
3. if no exception is signaled, modifies the GSPT (if this has not already been done by a previous compilation job) to remove the write permissions for the corresponding virtual memory page in the guest shadow address space 404 (and any other guest shadow address spaces that map the same physical page);
4. maps the virtual memory page as readable in the CSPT, so that the dynamic compiler can read guest program instructions from the corresponding physical memory page; and
5. re-tries the load instruction that triggered the fault, thereby returning control to the compilation process.

FIG. 4B illustrates the state stored by a GSPT and a CSPT after a dynamic compiler has translated a set of guest program instructions into a set of native code instructions. As described above, during the compilation process the dynamic compiler creates a virtual memory page mapping for physical page 410 in the compiler shadow address space 412, and ensures that the virtual memory page mappings 416 in both the guest shadow address space 404 and compiler shadow address space 412 both indicate read-only access. At the conclusion of the compilation process, the dynamic compiler writes the translated guest code 418 into code cache 414, and updates an index 420 (described in more detail in the following section) that maps guest program instructions in virtual memory pages to their corresponding translated instructions in code cache 414.

Note that by changing the GSPT entry for the virtual memory page to read-only (not-writable), the system ensures that subsequent guest program accesses that attempt to write to guest program instructions that have been translated will trigger a fault. Furthermore, changing the GSPT entry for the virtual memory page to read-only prior to compiling ensures that the contents of the page will not change while the dynamic compiler is compiling a set of guest program instructions. Note, however, that while the virtual memory page mappings in the GSPT are set to read-only, the underlying permissions in the (normal, first-level) underlying page table remain unchanged (e.g., read/write/execute access) from the viewpoint of the guest program. The system uses the permission changes in the shadow page tables to indicate the operations that have occurred (e.g., that the guest program code has been translated, and that subsequent write attempts to the guest program instructions should be trapped) to the runtime environment. The guest program remains unaware of the shadow page tables and all aspects of the native hardware, and hence operates independently of such changes.

Further attempts by the compiler to read the same virtual memory page (e.g., to translate other guest program instructions in the same physical memory page) will proceed normally. When accessing a virtual page that is already mapped in the CSPT, the state of the CSPT and processor TLB cache (by not triggering a trap) indicate that the guest shadow page table has already been modified (to be read-only), and has not been subsequently modified (e.g., unmapped). Other compiler threads (operating either concurrently or afterwards) will hence be able to continue without incurring additional protection overhead. Note that the alternative of performing software checks to determine whether a virtual page has been modified every time the compiler is invoked to translate additional guest program instructions would involve significant additional compiler overhead.

After a page in the GSPT has been protected (as read-only), an attempt by guest program instructions to store to the write-protected virtual memory page (via the GSPT) will invoke the guest shadow page fault handler, which:

1. checks the original guest operating system (e.g., first-level) page table to determine whether the virtual memory page was mapped as non-writable by the guest program, in which case the resulting page fault is reflected to the guest operating system; and 2. checks whether the virtual memory page was mapped as writable by the guest program, but was modified to be non-writable in the GSPT because some or all of the guest program instructions in the virtual memory page have been translated into native instructions.

In the second scenario, the system: (1) invalidates the corresponding translated code (in code cache 414); (2) de-maps the virtual memory page from the CSPT; and (3) re-enables the write permissions for the virtual memory page in the GSPT. At this point the system has ensured that the previous (now invalid) set of cached code that corresponds to the to-be-modified guest program instruction can no longer be executed. After the guest shadow page fault handler returns control to the guest program, the store to this guest program instruction succeeds, and program execution continues. Note that in some situations (subject to guest architectural rules on the visibility of code updates), invalidating the translated code may involve interrupting threads executing the translated code.

FIG. 4C illustrates the state stored by a GSPT and a CSPT after the system has invalidated a set of translated code in response to an attempted write to a guest program instruction in virtual memory page 402. The mapping for the virtual memory page 422 in guest shadow address space 404 remains, and has been marked with read/write permissions. The virtual memory page 402 has, however, been de-mapped 424 from the compiler shadow address space 412 and the corresponding translated code in code cache 414 has been invalidated 426. During the invalidation process, the system has also removed the link in the index 420 that linked the virtual memory page mapping 422 in the guest shadow address space 404 with the now invalidated translated code 426.

The above-described techniques facilitate intercepting any writes to guest program instructions that have been translated and invalidating the corresponding translated code before such a write executes. Subsequent attempts to execute the modified guest program code find no corresponding translated code in the code cache, and trigger the system to invoke the compiler to translate the modified guest program code and use the shadow page tables to again re-protect the virtual memory page from further un-trapped writes. Note that the two shadow page tables serve as two different views into the same physical memory space, so after the guest modifies the contents of a physical memory page, the compiler (when loading that physical memory page via the CSPT) will automatically see the most up-to-date values written to the physical memory page. Note also that because the guest program code does not have direct access to the native hardware (e.g., the shadow page tables are always controlled by the compiler and runtime system), the guest program code is not aware of the compiler address space and hence cannot bypass the write protection check.

Figure 5:
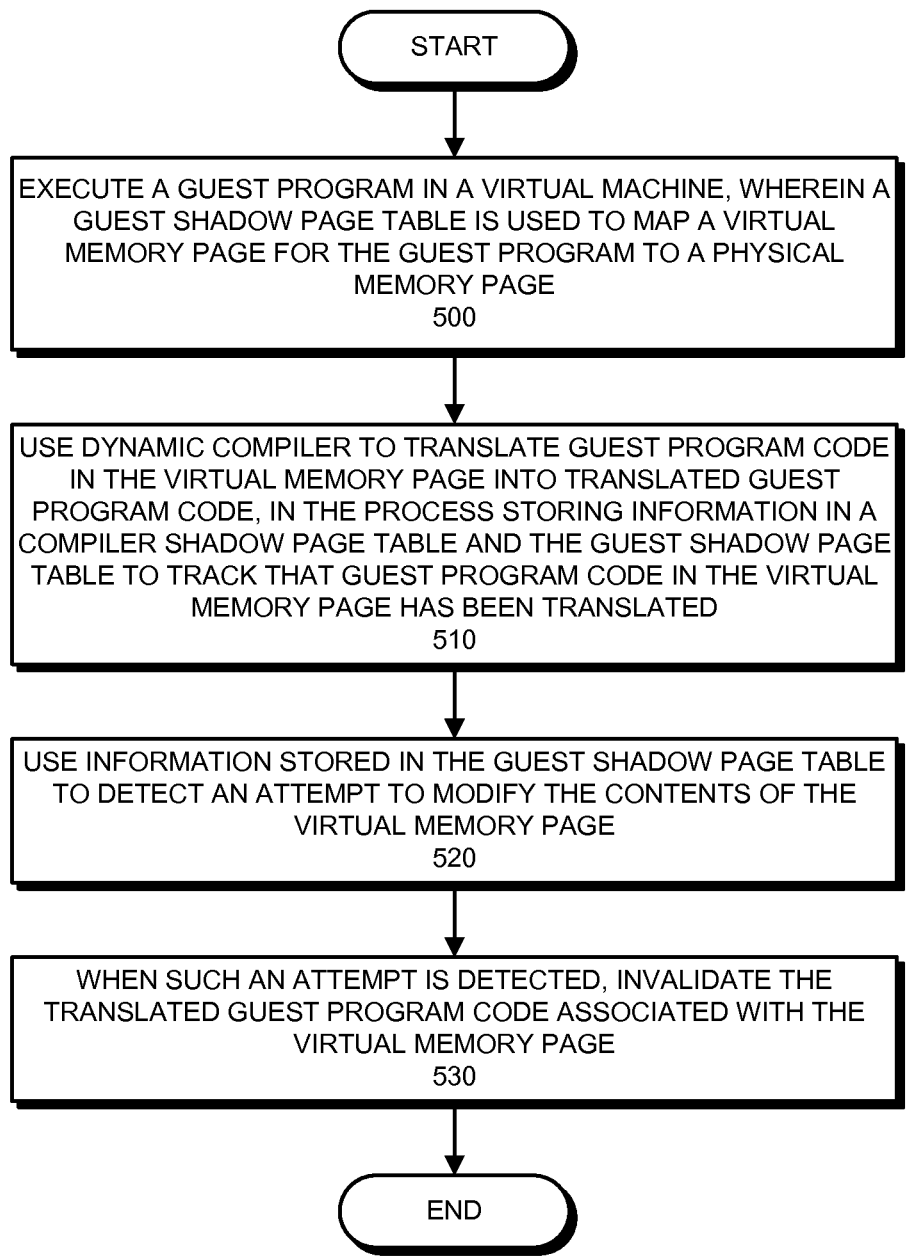
FIG. 5 presents a flow chart illustrating the process of protecting translated guest program code executing in a virtual machine in accordance with an embodiment of the present invention.

FIG. 5 presents a flow chart illustrating the process of protecting translated guest program code executing in a virtual machine. The system executes a guest program in a virtual machine (operation 500). During execution, the system uses a guest shadow page table associated with the guest program and the virtual machine to map a virtual memory page for the guest program to a physical memory page of the computing device upon which the virtual machine is executing. The system then uses a dynamic compiler to translate guest program code in the virtual memory page into translated guest program code, in the process storing tracking information in a compiler shadow page table and the guest shadow page table to indicate that guest program code in the virtual memory page has been translated (operation 510). The system uses this stored tracking information to detect attempts to modify the contents of the virtual memory page (operation 520). When such an attempt is detected, the system invalidates the translated guest program code associated with the virtual memory page (operation 530).

Figure 6:
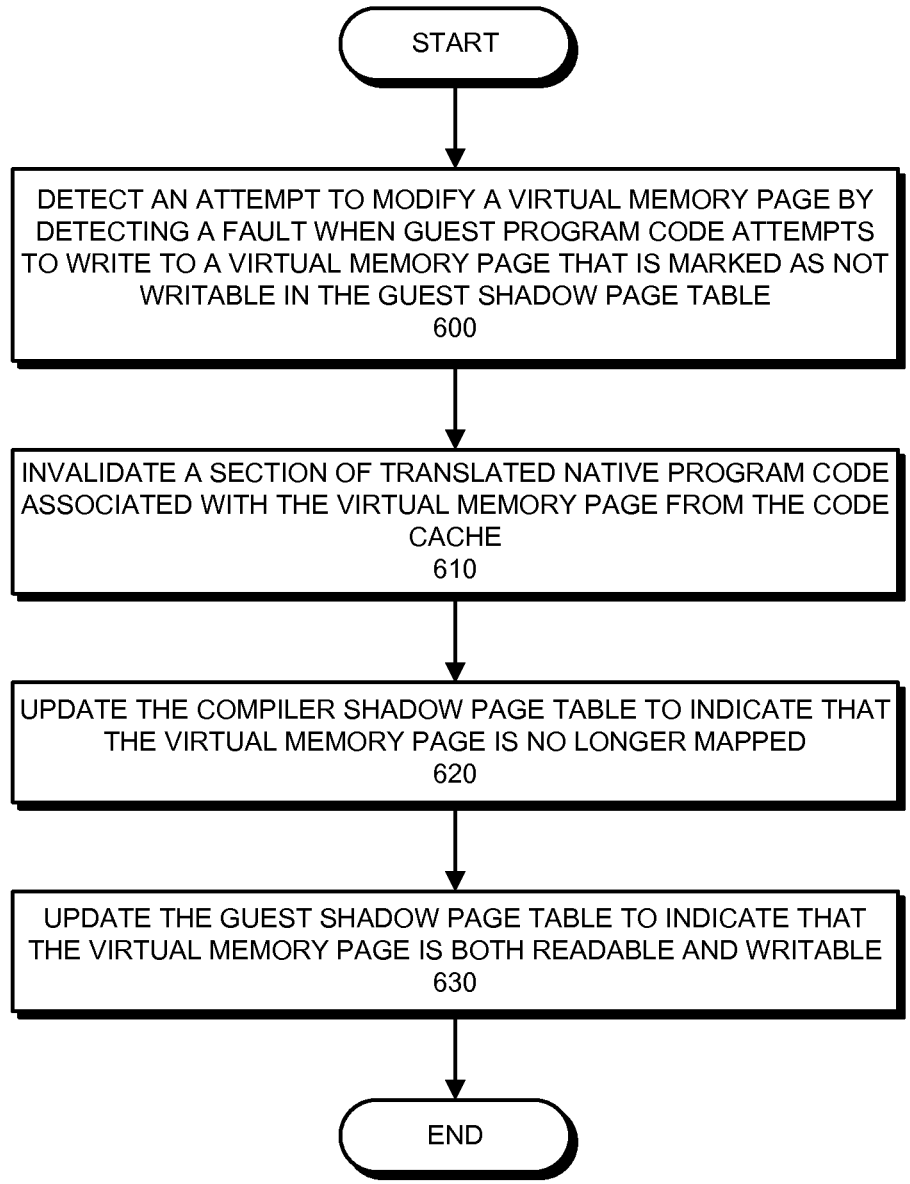
FIG. 6 presents a flow chart illustrating the process of invalidating protected translated guest program code in accordance with an embodiment of the present invention.

FIG. 6 presents a flow chart illustrating the process of invalidating protected translated guest program code for a virtual machine. During operation, the system detects an attempt to modify a protected virtual memory page by detecting a fault that is triggered when the virtual machine attempts to write to a virtual memory page that is marked as not writable in the guest shadow page table (operation 600). The fault handler then: (1) invalidates a section of translated native program code associated with the virtual memory page from the code cache (operation 610); (2) updates the compiler shadow page table to indicate that the virtual memory page is no longer mapped (thereby indicating that the section of translated native program instructions associated with the virtual memory page is no longer available) (operation 620); and (3) updates the guest shadow page table to indicate that the virtual memory page is both readable and writable (operation 630), thereby "un-protecting" the virtual memory page from writes.

In some embodiments, accessing multiple shadow page tables associated with a guest program may involve hardware and/or software support for simultaneous access to multiple address spaces. In a computing device with a native ISA that supports references to multiple address spaces at the same time, the described techniques may involve assigning each shadow page table to a different address space identifier (ASI), and then performing loads and stores that specify specific target ASIs as needed. For instance, some embodiments may use a SPARC® secondary context ID to reference an ASI in a load/store instruction, or specify a shadow page table using an address space reference in a general purpose register or control register.

Note that every memory access for a guest program is serviced using one of the two shadow page tables, with the choice of shadow page table for a given fetch depending on the current operation. When loading or executing the guest program, the system uses the GSPT, and when compiling portions of the guest program, the system uses the CSPT. In some embodiments, with proper locking, multiple compiler threads may be able to all work in the compiler ASI to translate different sections of guest program code.

Note also that page sizes and protection bits may differ among the original guest page table, the GSPT, and the CSPT. Typically, the original guest page table (as defined for the guest hardware) specifies some combination of read, write and execute permission bits for each virtual memory page. In some embodiments, the shadow page tables only specify bits to indicate read and write permissions.

Using Compiler Shadow Page Tables to Build an Index for Translated Code

The system needs to be able to locate and invalidate the code translated for a write-protected virtual memory page when a guest program attempts to write to the virtual memory page. However, locating the correct block of translated code in the code cache can involve considerable overhead. Furthermore, a given virtual memory page may include multiple different blocks of guest code instructions that are translated separately and located in different locations in the code cache, or a single compilation may span multiple virtual memory pages. Identifying and invalidating the correct corresponding sections of translated code (e.g., using a bitmap or hash set of code pages to identify and lookup each compilation job) can involve significant complexity and effort.

Some embodiments of the present invention maintain an index between blocks of guest program instructions and their associated translated code segments in the code cache, thereby allowing the system to easily identify and invalidate a section of translated code when a guest program attempts to write to a protected virtual memory page. The system can use the CSPT to build this index. For instance, each guest code page related to a compilation job is mapped into the CSPT. By giving each compilation job a clean (empty) CSPT, the system can summarize the set of modifications to the CSPT (e.g., the additional pages mapped into the CSPT during a compilation) and then use this information to add one or more entries to the index that link the virtual memory page(s) containing the guest program instructions to the particular compilation job. When performing an invalidation, the system uses the virtual memory page and/or the guest program instruction being modified to look up any corresponding section(s) of translated code that need to be invalidated. For instance, the system may determine that a compilation job spans two virtual memory pages in the GSPT, and add into the index a set of links between these two virtual memory pages and the translated code segment in the code cache. Subsequently, a guest program instruction attempting to write to either of those pages will trigger an index look-up that identifies and invalidates the translated code segment (as well as the removal of the associated link information from the index).

As mentioned above, a given virtual memory page may include multiple different blocks of guest code instructions that are translated separately, and located in different locations in the code cache. In some embodiments, a write to a protected virtual memory page may be configured to trigger the invalidation of all translated code segments found in the virtual memory page. In some alternative embodiments, only translated code segments directly affected by the write are invalidated. In such embodiments, the system needs to ensure that other guest program instructions in the virtual memory page that are associated with other translated code segments are not left unprotected (e.g., that such blocks remain read-only). More specifically, in such scenarios the system may not be able to change the mapping in the GSPT for the virtual memory page to be writable, because then the system might miss other stores to the same virtual memory page that should invalidate other (distinct) translated code segments. Hence, the system may need to use other techniques that ensure that the virtual memory page remains protected despite the pending write. For instance, the system may: (1) invalidate the affected translated code segment; (2) temporarily un-protect the virtual memory page while still executing in the trap handler; (3) emulate the write instruction in the trap handler; and (4) immediately re-enable the read-only permissions for the virtual memory page in the GSPT prior to leaving the trap handler, thereby ensuring that other sections of translated code that are based on guest instructions in the virtual memory page remain protected during the write.

Note that a physical memory page containing guest program instructions that have been translated may be shared across two or more guest processes, and may be mapped to different virtual addresses in the different guest address spaces. In such scenarios, if one guest process attempts to write to the physical memory page, the system needs to ensure for correctness that the corresponding translated code segment is invalidated for all of the other guest processes. The system may use a range of techniques to achieve these results. For instance, the system may be configured to walk through the shadow page tables of guest processes sharing translated code to find such instances. Alternatively, the system may be configured to include an index that maps domain pages and/or physical pages to a set of translated code cache entries that need to be invalidated if the corresponding page is modified (e.g., an index similar to the one described above, but applied to either domain or physical pages instead of virtual pages).

Similarly, when compiling a set of guest program instructions and modifying the GSPT for one guest process to be read-only, the system needs to ensure that the virtual memory page mappings for the same virtual memory page are also protected (marked as read-only) in the GSPTs of the other guest processes. In one embodiment, the system maintains a set of back-links from entries in the second-level page table (that translates domain-virtual addresses to physical addresses) to the guest processes that map that translation in a shadow page table. The system can use these back-links to mark the virtual memory page as read-only in each indicated guest address space, so that any writes to the shared underlying physical memory pages can be trapped and managed correctly. Note that the actual techniques used to ensure that all threads see an update may be system-dependent, and may involve coherent updates to private TLBs, an update of a shared TLB, or an interprocessor interrupt and local TLB invalidation.

In summary, embodiments of the present invention facilitate protecting translated program code in a virtual machine that supports self-modifying guest program code. The described system uses two shadow page tables to protect virtual memory pages whose contents have been translated into native instructions. The system then detects when guest programs attempt to write to these virtual memory pages, and invalidates the corresponding translated code sections from a code cache. By using two shadow page tables, the system reduces virtual machine overhead by integrating execute-permission checks and the caching of the write-protection state with the address translation operations that are performed when the compiler and guest program load instructions from a guest virtual address.

Computing Environment

In some embodiments of the present invention, the described system can be incorporated into and/or accessed by a wide range of computing devices in a computing environment. For instance, a virtual machine may be implemented on a range of computing devices, and guest programs may be transferred between such computing devices.

Figure 7:
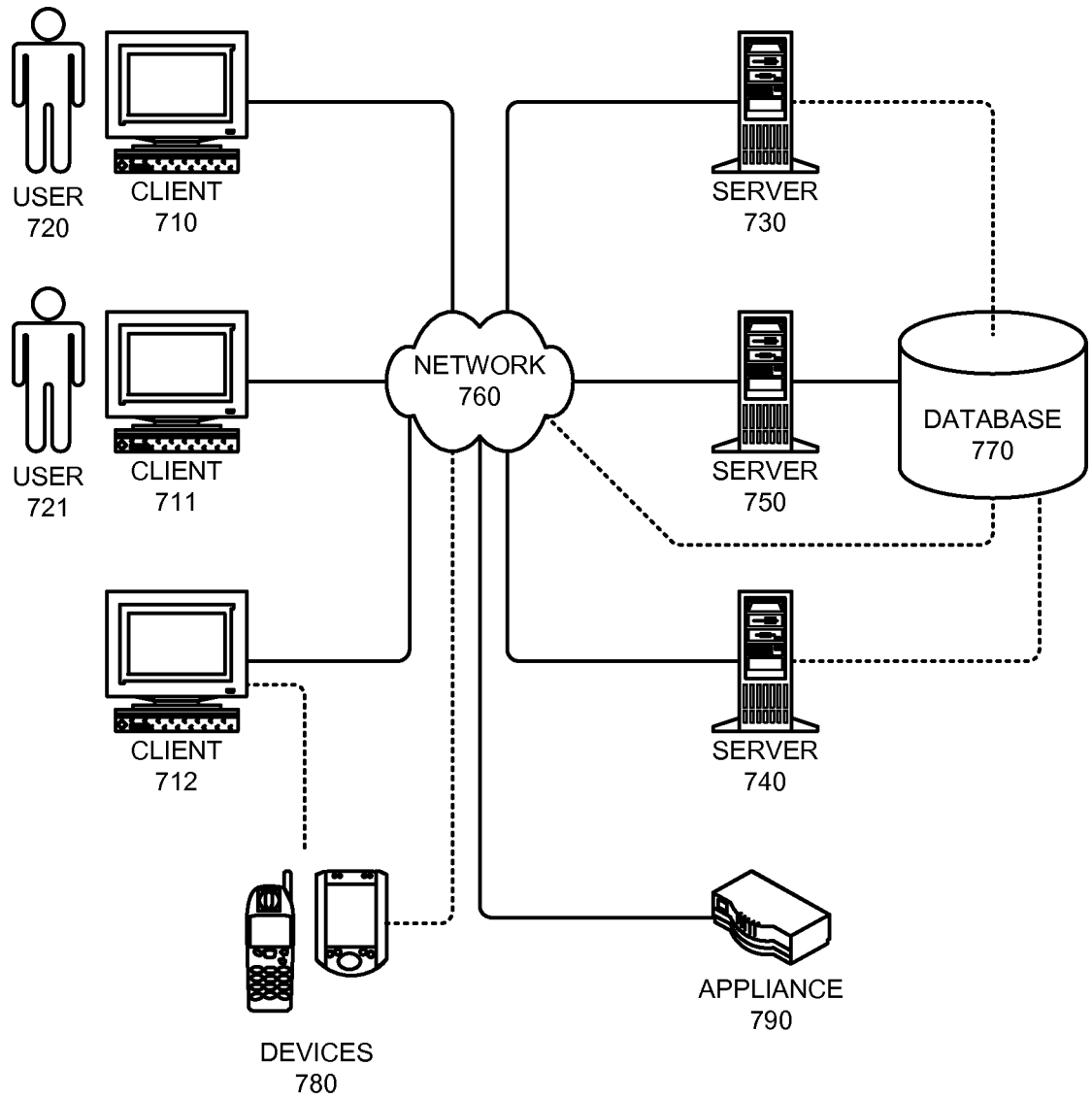
FIG. 7 illustrates a computing environment in accordance with an embodiment of the present invention.

FIG. 7 illustrates a computing environment 700 in accordance with an embodiment of the present invention. Computing environment 700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 7, computing environment 700 includes clients 710-712, users 720 and 721, servers 730-750, network 760, database 770, devices 780, and appliance 790.

Clients 710-712 can include any node on a network including computational capability and including a mechanism for communicating across the network. Additionally, clients 710-712 may comprise a tier in an n-tier application architecture, wherein clients 710-712 perform as servers (servicing requests from lower tiers or users), and wherein clients 710-712 perform as clients (forwarding the requests to a higher tier).

Similarly, servers 730-750 can generally include any node on a network including a mechanism for servicing requests from a client for computational and/or data storage resources. Servers 730-750 can participate in an advanced computing cluster, or can act as stand-alone servers. In one embodiment of the present invention, server 740 is an online "hot spare" of server 750.

Users 720 and 721 can include: an individual; a group of individuals; an organization; a group of organizations; a computing system; a group of computing systems; or any other entity that can interact with computing environment 700.

Network 760 can include any type of wired or wireless communication channel capable of coupling together computing nodes. This includes, but is not limited to, a local area network, a wide area network, or a combination of networks. In one embodiment of the present invention, network 760 includes the Internet. In some embodiments of the present invention, network 760 includes phone and cellular phone networks.

Database 770 can include any type of system for storing data in non-volatile storage. This includes, but is not limited to, systems based upon magnetic, optical, or magneto-optical storage devices, as well as storage devices based on flash memory and/or battery-backed up memory. Note that database 770 can be coupled: to a server (such as server 750), to a client, or directly to a network. In some embodiments of the present invention, database 770 is used to store information related to virtual machines and/or guest programs. Alternatively, other entities in computing environment 700 may also store such data (e.g., servers 730-750).

Devices 780 can include any type of electronic device that can be coupled to a client, such as client 712. This includes, but is not limited to, cell phones, personal digital assistants (PDAs), smart-phones, personal music players (such as MP3 players), gaming systems, digital cameras, portable storage media, or any other device that can be coupled to the client. Note that in some embodiments of the present invention, devices 780 can be coupled directly to network 760 and can function in the same manner as clients 710-712.

Appliance 790 can include any type of appliance that can be coupled to network 760. This includes, but is not limited to, routers, switches, load balancers, network accelerators, and specialty processors. Appliance 790 may act as a gateway, a proxy, or a translator between server 740 and network 760.

Note that different embodiments of the present invention may use different system configurations, and are not limited to the system configuration illustrated in computing environment 700. In general, any device that is capable of receiving a guest program and/or executing a guest program in a virtual machine may incorporate elements of the present invention.

Figure 8:
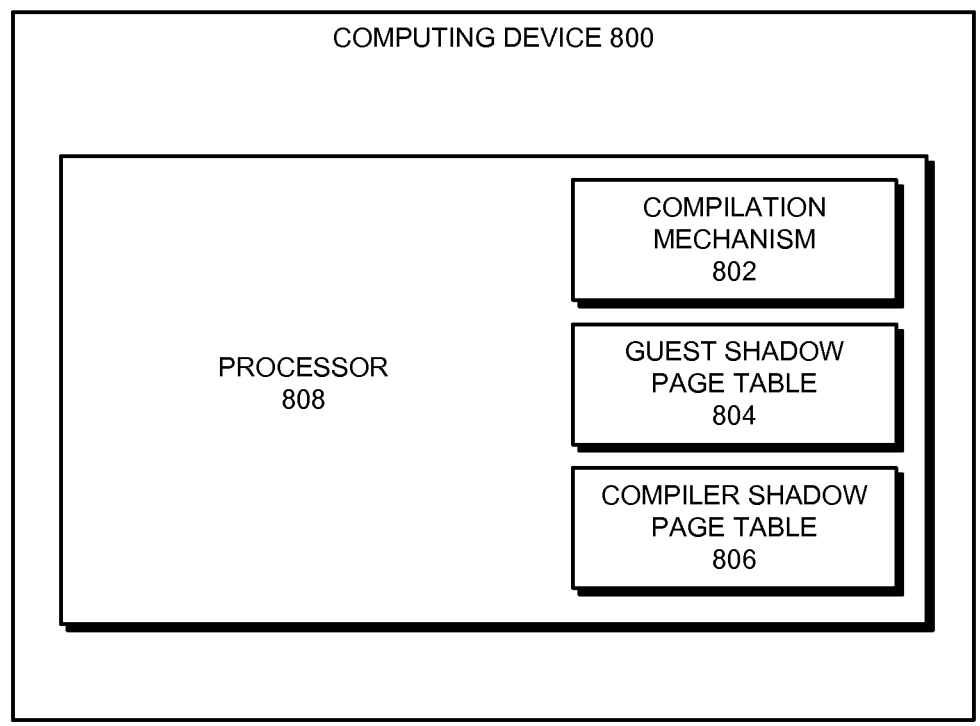
FIG. 8 illustrates a computing device that supports protecting translated guest program code executing in a virtual machine in accordance with an embodiment of the present invention.

FIG. 8 illustrates a computing device 800 that supports protecting translated guest program code executing in a virtual machine. Computing device 800 includes processor 808, which includes compilation mechanism 802, guest shadow page table 804, and compiler shadow page table 806. While executing a guest program in the virtual machine, the processor uses guest shadow page table 804 to map a virtual memory page for the guest program to a physical memory page in the computing device. Processor 808 then uses compilation mechanism 802 (e.g., a dynamic compiler) to translate guest program code in the virtual memory page into translated guest program code comprising native program instructions for the computing device. During compilation, compilation mechanism 802 stores in compiler shadow page table 806 and the guest shadow page table 804 information that tracks whether the guest program code in the virtual memory page has been translated. Compilation mechanism 802 subsequently uses the information stored in guest shadow page table 804 to detect attempts to modify the contents of the virtual memory page. Upon detecting such an attempt, processor 808 invalidates the translated guest program code associated with the virtual memory page.

In some embodiments of the present invention, some or all aspects of compilation mechanism 802, guest shadow page table 804, and compiler shadow page table 806, and/or hardware support for accessing compilation mechanism 802, guest shadow page table 804, and compiler shadow page table 806 can be implemented as dedicated hardware modules in processor 808. For example, processor 808 can include one or more specialized circuits for performing the operations of the mechanisms. Alternatively, some or all of the operations associated with compilation mechanism 802, guest shadow page table 804, and compiler shadow page table 806 may be performed using general purpose circuits in processor 808 that are configured using processor instructions.

Although FIG. 8 illustrates compilation mechanism 802, guest shadow page table 804, and compiler shadow page table 806 as being included in processor 808, in alternative embodiments some or all of these mechanisms are external to processor 808. For instance, these mechanisms may be incorporated into hardware modules external to processor 808. These hardware modules can include, but are not limited to, processor chips, application-specific integrated circuit (ASIC) chips, field-programmable gate arrays (FPGAs), memory chips, and other programmable-logic devices now known or later developed.

In these embodiments, when the external hardware modules are activated, the hardware modules perform the methods and processes included within the hardware modules. For example, in some embodiments of the present invention, the hardware module includes one or more dedicated circuits for performing the operations described below. As another example, in some embodiments of the present invention, the hardware module is a general-purpose computational circuit (e.g., a microprocessor or an ASIC), and when the hardware module is activated, the hardware module executes program code (e.g., BIOS, firmware, program code, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for protecting translated guest program code of a self-modifying guest program while executing the guest program as a guest process in a virtual machine that is executing on a physical host, comprising:
   loading a set of guest program instructions into a guest virtual memory page, which comprises;
   storing a mapping of the page's address to a guest physical memory address in a first-level page table;
   storing a mapping of the guest physical memory address to a host physical memory address in a second-level page table;
   storing a first mapping of the page's address to the host physical memory address in a guest shadow page table (GSPT), wherein the GSPT enables the guest process to translate guest virtual addresses into host physical memory addresses with a single mapping; and configuring the GSPT to indicate that the set of guest program instructions in the page has not been translated;

executing the set of guest program instructions, which comprises:
invoking a dynamic compiler to translate the set of guest program instructions;
in response to the dynamic compiler determining that a compiler shadow page table (CSPT) does not have a mapping of the page's address to the host physical memory address, wherein the CSPT enables a dynamic compiler to translate guest virtual addresses into host physical memory addresses with a single mapping:
configuring the GSPT to indicate that the set of guest program instructions in the page has been translated;
storing a second mapping of the page's address to the host physical memory address in the CSPT; and
translating the set of guest program instructions into native program instructions for the physical host;
caching the native program instructions; and
executing the native program instructions;
in response to detecting an attempt by the executing native program instructions to write to the page,
determining, from the GSPT, that the set of guest program instructions in the page has been translated;
invalidating the cached native program instructions;
invalidating the second mapping in the CSPT;
configuring the GSPT to indicate that the set of guest program instructions in the page has not been translated; and
writing to the page.

2. The method of claim 1, wherein configuring the guest shadow page table to indicate that the set of guest program instructions in the page has been translated involves:
marking the virtual memory page as not writable in the guest shadow page table;
marking the virtual memory page as readable in the compiler shadow page table prior to loading and compiling the set of guest program instructions in the virtual memory page; and
detecting an attempt to write to the virtual memory page by detecting a fault when the virtual machine attempts to write to the virtual memory page that is marked as not writable in the guest shadow page table.

3. The method of claim 2, detecting an attempt to write to the page involves:
determining whether the virtual memory page was marked read-only by the guest program; and
if so, handling the fault in a guest operating system associated with the guest program.

4. The method of claim 2,
wherein the virtual memory page may contain two or more guest program code segments that have been independently translated into native program instructions; and
wherein invalidating a section of translated guest program code can involve one or more of the following:
invalidating some or all of the translated guest program code segments associated with one or more virtual memory pages;
modifying the virtual memory page in a protected manner; and
subsequently restoring the not-writable status of the virtual memory page following a modification.

5. The method of claim 2, wherein marking the virtual memory page as readable in the compiler shadow page table indicates that the guest shadow page table has already been modified to protect the virtual memory page from writes, thereby allowing the dynamic compiler to operate with reduced overhead and checks.

6. The method of claim 1, wherein invalidating the cached native program instructions involves:
invalidating, from a code cache, a section of translated native program code associated with the virtual memory page.

7. The method of claim 6, wherein compiling the guest program code involves:
maintaining an entry in an index that maps the virtual memory page containing the set of guest program instructions being translated to the section of translated native program instructions in the code cache; and
wherein the index facilitates determining the set of native program instructions in the code cache to be invalidated when the virtual memory page is modified.

8. The method of claim 1,
wherein the dynamic compiler and the guest program are associated with different address space context identifiers; and
wherein an address space context identifier used during an operation determines the shadow page table that will be affected by the operation.

9. The method of claim 1,
wherein multiple guest program instances simultaneously executing in multiple guest address spaces may share one or more sections of translated native program code; and
wherein the guest shadow page table and the compiler shadow page table associated with each of the multiple guest program instances will need to be updated when one of the multiple guest program instances modifies a virtual memory page associated with a shared section of translated native program code.

10. A non-transitory computer-readable storage medium storing instructions that when executed by a computer cause the computer to perform a method for protecting translated guest program code of a self-modifying guest program while executing the guest program as a guest process in a virtual machine that is executing on a physical host, the method comprising:
loading a set of guest program instructions into a guest virtual memory page, which comprises;
storing a mapping of the page's address to a guest physical memory address in a first-level page table;
storing a mapping of the guest physical memory address to a host physical memory address in a second-level page table;
storing a first mapping of the page's address to the host physical memory address in a guest shadow page table (GSPT), wherein the GSPT enables the guest process to translate guest virtual addresses into host physical memory addresses with a single mapping; and
configuring the GSPT to indicate that the set of guest program instructions in the page has not been translated;
executing the set of guest program instructions, which comprises:
invoking a dynamic compiler to translate the set of guest program instructions;
in response to the dynamic compiler determining that a compiler shadow page table (CSPT) does not have a mapping of the page's address to the host physical memory address, wherein the CSPT enables a dynamic compiler to translate guest virtual addresses into host physical memory addresses with a single mapping:
configuring the GSPT to indicate that the set of guest program instructions in the page has been translated;
storing a second mapping of the page's address to the host physical memory address in the CSPT; and
reinvoking the dynamic compiler, thereby enabling the dynamic compiler to translate the set of guest program instructions into native program instructions for the physical host;
caching the native program instructions; and
executing the native program instructions;
in response to detecting an attempt by the executing native program instructions to write to the page,
determining, from the GSPT, that the set of guest program instructions in the page has been translated;
invalidating the cached native program instructions;
invalidating the second mapping in the CSPT;
configuring the GSPT to indicate that the set of guest program instructions in the page has not been translated; and
writing to the page.

11. The computer-readable storage medium of claim 10, wherein configuring the guest shadow page table to indicate that the set of guest program instructions in the page has been translated involves:
marking the virtual memory page as not writable in the guest shadow page table;
marking the virtual memory page as readable in the compiler shadow page table prior to loading and compiling the set of guest program instructions in the virtual memory page; and
detecting an attempt to write to the virtual memory page by detecting a fault when the virtual machine attempts to write to the virtual memory page that is marked as not writable in the guest shadow page table.

12. The computer-readable storage medium of claim 11, detecting an attempt to write to the page involves:
determining whether the virtual memory page was marked read-only by the guest program; and
if so, handling the fault in a guest operating system associated with the guest program.

13. The computer-readable storage medium of claim 11, wherein the virtual memory page may contain two or more guest program code segments that have been independently translated into native program instructions; and
wherein invalidating a section of translated guest program code can involve one or more of the following:
invalidating some or all of the translated guest program code segments associated with one or more virtual memory pages;
modifying the virtual memory page in a protected manner; and
subsequently restoring the not-writable status of the virtual memory page following a modification.

14. The computer-readable storage medium of claim 11, wherein marking the virtual memory page as readable in the compiler shadow page table indicates that the guest shadow page table has already been modified to protect the virtual memory page from writes, thereby allowing the dynamic compiler to operate with reduced overhead and checks.

15. The computer-readable storage medium of claim 10, wherein invalidating the cached native program instructions involves:
invalidating, from a code cache, a section of translated native program code associated with the virtual memory page.

16. The computer-readable storage medium of claim 15, wherein compiling the guest program code involves:
maintaining an entry in an index that maps the virtual memory page containing the set of guest program instructions being translated to the section of translated native program instructions in the code cache; and
wherein the index facilitates determining the set of native program instructions in the code cache to be invalidated when the virtual memory page is modified.

17. The computer-readable storage medium of claim 10, wherein the dynamic compiler and the guest program are associated with different address space context identifiers; and
wherein an address space context identifier used during an operation determines the shadow page table that will be affected by the operation.

18. A computing device that facilitates protecting translated guest program code of a self-modifying guest program while executing the guest program as a guest process in a virtual machine that is executing on a physical host, comprising:
a processor that:
loads a set of guest program instructions into a guest virtual memory page, which comprises;
storing a mapping of the page's address to a guest physical memory address in a first-level page table;
storing a mapping of the guest physical memory address to a host physical memory address in a second-level page table;
storing a first mapping of the page's address to the host physical memory address in a guest shadow page table (GSPT), wherein the GSPT enables the guest process to translate guest virtual addresses into host physical memory addresses with a single mapping; and
configuring the GSPT to indicate that the set of guest program instructions in the page has not been translated;
executes the set of guest program instructions, which comprises:
invoking a dynamic compiler to translate the set of guest program instructions;
in response to the dynamic compiler determining that a compiler shadow page table (CSPT) does not have a mapping of the page's address to the host physical memory address, wherein the CSPT enables a dynamic compiler to translate guest virtual addresses into host physical memory addresses with a single mapping:
configuring the GSPT to indicate that the set of guest program instructions in the page has been translated;
storing a second mapping of the page's address to the host physical memory address in the CSPT; and
reinvoking the dynamic compiler, thereby enabling the dynamic compiler to translate the set of guest program instructions into native program instructions for the physical host;
caching the native program instructions; and
executing the native program instructions;
in response to detecting an attempt by the executing native program instructions to write to the page, determining, from the GSPT, that the set of guest program instructions in the page has been translated;
invalidating the cached native program instructions;
invalidating the second mapping in the CSPT;
configuring the GSPT to indicate that the set of guest program instructions in the page has not been translated; and
writing to the page.

* * * * *